(12) United States Patent  (10) Patent No.: US 7,589,496 B2
Chatterjee et al.  (45) Date of Patent: Sep. 15, 2009

(54) USER INPUT DEVICE CHARGING SYSTEM

(75) Inventors: Monique Chatterjee, Seattle, WA (US);
Daniel G. O'Neil, Seattle, WA (US);
Daniel L. Odell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 333 days.

(21) Appl. No.: 11/422,011

(22) Filed: Jun. 2, 2006

(65) Prior Publication Data

US 2008/0002340 A1  Jan. 3, 2008

(51) Int. Cl.
*H02J 7/00* (2006.01)
(52) U.S. Cl. .................. 320/114; 320/115; 345/163; 710/73
(58) Field of Classification Search ............. 320/115, 320/108, 111, 114; 345/163, 157, 169; 710/73
See application file for complete search history.

(56) References Cited

U.S. PATENT DOCUMENTS

| | | | |
|---|---|---|---|
| 5,828,365 A | | 10/1998 | Chen |
| 6,476,795 B1* | | 11/2002 | Derocher et al. ............. 345/163 |
| 6,498,458 B1* | | 12/2002 | Chen ........................... 320/114 |
| 7,106,302 B2* | | 9/2006 | Chen et al. ................... 345/163 |
| 2003/0048254 A1* | | 3/2003 | Huang ......................... 345/163 |
| 2003/0160762 A1 | | 8/2003 | Lu |
| 2004/0145567 A1 | | 7/2004 | Ho |
| 2004/0201574 A1* | | 10/2004 | Wei ............................. 345/163 |
| 2005/0017675 A1 | | 1/2005 | Hsieh et al. |
| 2005/0108580 A1 | | 5/2005 | Chung |
| 2005/0116933 A1* | | 6/2005 | Huang et al. ................ 345/163 |
| 2005/0152111 A1 | | 7/2005 | Skurdal et al. |
| 2005/0200605 A1* | | 9/2005 | Chen ........................... 345/163 |
| 2005/0231485 A1 | | 10/2005 | Jones et al. |

2006/0007147 A1  1/2006  Lee (Continued)

FOREIGN PATENT DOCUMENTS

GB  2418006 A  3/2006

(Continued)

OTHER PUBLICATIONS

Brandon King, "Logitech G7 Review", Designtechnica, Dec. 14, 2005, 4 sheet, printed from http://reviews.designtechnica.com/review_printerfriendly3352.html.

(Continued)

*Primary Examiner*—Edward Tso
*Assistant Examiner*—Arun Williams
(74) *Attorney, Agent, or Firm*—Senniger Powers LLP

(57) ABSTRACT

An input device charging system is presented. The input device charging system includes a base having a primary alignment feature and a charging connection. The alignment feature and charging connection protrude from a surface of the base and the charging connection includes components for forming an electrical connection with an input device. The input device charging system also includes an input device, such as a mouse, configured for horizontal placement on the base. The input device includes a primary alignment feature and a charging connection configured to correspond to the primary alignment feature and charging connection of the base. The input device may be placed on the base in any direction in a horizontal plane and rotated into a charging position in which both alignment features are connected.

15 Claims, 8 Drawing Sheets

U.S. PATENT DOCUMENTS

2006/0202660 A1* 9/2006 Chang .................. 320/115

FOREIGN PATENT DOCUMENTS

WO 2006/013343 A2 2/2006

OTHER PUBLICATIONS

Iogear Wireless RF Keyboard and Optical Mouse Combo, 2 sheets, printed Mar. 23, 2006 from http://www.bhphotovideo.com/bnh/controller/home?A=details&Q=&is=REG&O=productlist&sku=357464.

Barry Fox, "One Charging Pad Could Power Up All Gadgets", NewScientist.com, Jan. 21, 2005, 3 sheets, printed from http://www.newscientist.com/article.ns?id=dn6891.

Wireless Mouse with USB Hub, 2 sheets, date unknown, printed Mar. 8, 2007 from http://usb.brando.com.hk/prod_detail.php?prod_id=00023.

Hub and Mouse, 4 sheets, date unknown, printed Mar. 8, 2007 from http://www.redferret.net/?p=6657, Wireless Mouse with USB Hub, 2 sheets.

Logitech Cordless Desktop MX 5000 Laser, 3 sheets, date unknown, printed Mar. 8, 2007 from http://www.logitech.com/index.cfm/products/details/US/EN,CRID=2158,CONTENTID=10776.

Logitech MX 1000 Laser Cordless Mouse, 2 sheets, date unknown, printed Mar. 8, 2007 from Internet Archive of Sep. 14, 2005 http://www.logitech.com/index.cfm/products/details/US/EN,CRID=2135,CONTENTID=9043.

* cited by examiner

USER INPUT DEVICE CHARGING SYSTEM

BACKGROUND

In response to an increasing desire for mobility and unrestricted movement in the realm of computing, various wireless technologies have evolved including transmission protocols such as BLUETOOTH, the various IEEE 802.11 standards, various proprietary protocols, and HomeRF. Such protocols have enabled peripherals to achieve wireless capabilities that alleviate many of the obstacles presented by corded devices. Wireless input devices are often used to control navigation and interaction with a user interface.

The use of wireless input devices has grown tremendously in many facets of computing. Due to wireless device dependency on batteries as a source of power, systems must be developed to provide convenient methods of recharging such wireless devices.

Rechargeable systems often include a recharging dock into which the input device is placed for charging. The dock includes an electrical connection for recharging the battery of the input device. Many input device docks only allow insertion of the input device into the dock from one direction or position. For example, charging docks exist in which a mouse is inserted vertically into the dock. These systems require additional effort on the part of the user to transfer the mouse from an in-use horizontal position to a vertical charging position before placing it in the dock. In addition, charging docks exist in which a mouse must be inserted horizontally in such a way that the housing of the mouse fits into the dock in one specific mating orientation. The mouse must be inserted into the dock in exactly the proper position and orientation in order for the charging to take place. The mouse can not be adjusted or aligned once it has been placed in contact with the dock. Such systems are often awkward, difficult to align and require an exact fit or orientation for charging to occur.

SUMMARY

An input device charging system may include a generally planar base, configured to receive an input device in a horizontal position. The generally planar base may include a primary alignment feature and a charging connection that protrude or project up from the top surface of the base. The primary alignment feature may provide initial alignment for the input device and may be configured to allow rotation of the input device about the primary alignment feature. The charging connection includes components for forming an electrical charging connection with the input device.

The input device charging system also includes an input device configured for horizontal placement on the generally planar base. The input device is generally a mouse, however other devices requiring charging may be used with the charging system. The input device may include a primary alignment feature and a charging connection configured to correspond to the primary alignment feature and charging connection of the base. The charging feature of the input device includes components for forming an electrical connection with the base.

The input device may be configured for placement on the base in a generally horizontal position. The input device may make initial contact with the base using the primary alignment feature in contact with the primary alignment feature of the base. The input device may be placed on the base in any direction in a horizontal plane. The input device is then rotated into a charging position in which both the primary alignment feature and the charging connection are in contact with the corresponding features formed on the base.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Aspects of the invention are illustrated by way of example and not limited in the accompanying figures in which like reference numerals indicate similar elements and in which.

DETAILED DESCRIPTION

Figure 1:
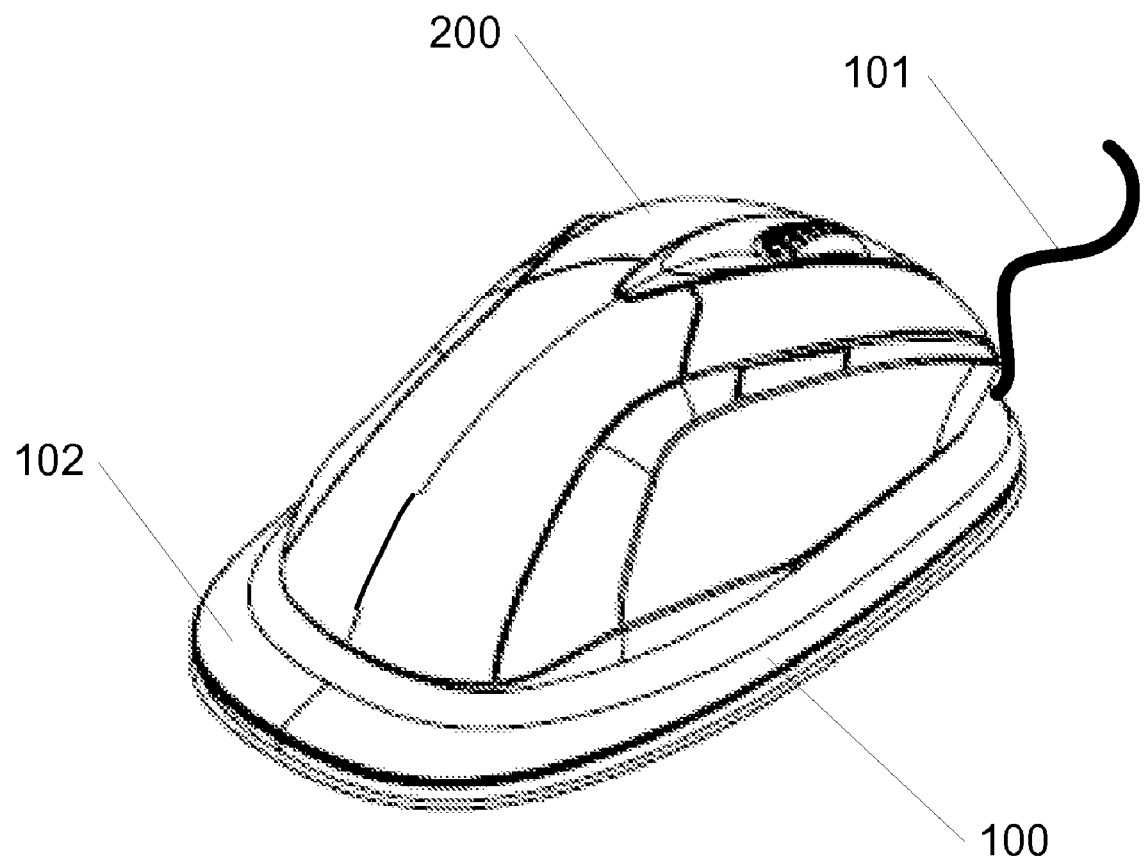
FIG. 1 depicts an input device charging system.

One arrangement for an input device charging dock 100 is shown in FIG. 1. FIG. 1 depicts the charging dock 100 as it may appear when connected to an input device 200 in a charging mode. The charging dock 100 includes a base 102 and is connected to a power supply via a cable 101. The cable 101 may terminate in an electrical plug, such as one that may be connected to an electrical outlet. Alternatively, the cable 101 may terminate in a USB, PS/2 or Firewire connection and connect to a computer via a compatible port. For ease of understanding, the following specification describes the input device as a mouse 200, however other types of rechargeable input devices may be used with this system, such as keyboards, wearable devices, gyroscopic pointing devices, remote pointing devices and remote controls. The input device 200 may be charged in a substantially horizontal position to provide stability to the recharging system and ease of use.

Figure 2:
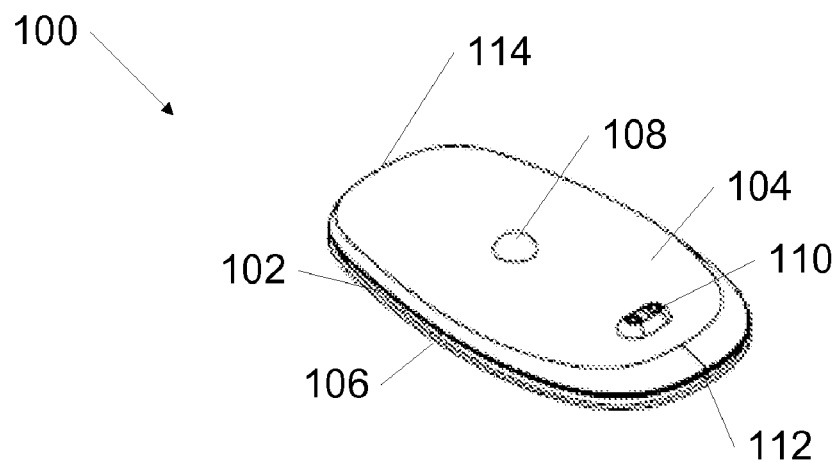
FIG. 2 is a perspective view of the charging base of the input device charging system of FIG. 1.
Figure 3:
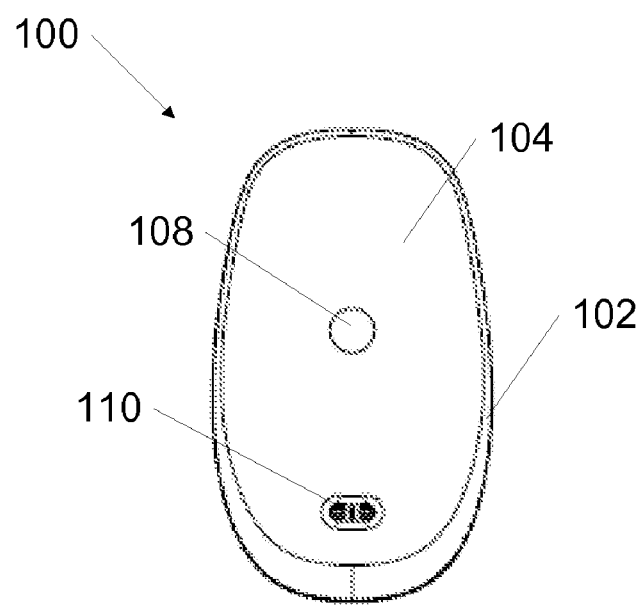
FIG. 3 is a top view of the charging base of the input device charging system of FIG. 1.

FIGS. 2 and 3 depict the input device charging dock 100. In one exemplary embodiment, the dock 100 includes a generally planar base 102 that is configured to receive an input device in a horizontal position. This configuration may allow ease of placement of the input device onto the charging dock 100. For example, with this horizontal positioning, no additional vertical repositioning of the input device is needed for recharging the device. A mouse may go directly from being in use to being recharged simply by placing the mouse on the charging dock 100 in its horizontal in use position.

In the configuration shown in FIGS. 2 and 3, the base 102 is a generally oblong shape, however, any suitable shape may be used for the base 102, such as rectangular, square, etc. The base 102 may be any size that allows the device 200 to mount horizontally.

The base 102 includes a top surface 104 and a bottom surface 106. In one exemplary embodiment, the top surface 104 of the base 102 is generally flat and includes at least one alignment feature. In one illustrative arrangement, the top surface 104 is generally flat and includes two upward protrusions. The primary alignment feature 108 may be male type alignment feature with a projection protruding from the top surface 104. The male type primary alignment feature 108 formed on the top surface 104 of the base 102 is configured to mate to a corresponding female type primary alignment feature having a recess located on a bottom surface of a mouse, as described and depicted hereinafter. In addition, the primary alignment feature 108 may aid in maintaining the position of the input device during charging. In another embodiment, the female type alignment feature may be located on the base 102, while the male type feature is formed on the device.

The male primary alignment feature 108 may be located in any position or location on the top surface 104 of the base 102. In an alternate embodiment, the alignment features may be located on the sides of the base 102. In one exemplary arrangement shown in FIG. 3, the male primary alignment feature 108 is located in the center of the base 102 to allow for ease of insertion of the input device. In another example, the male primary alignment feature 108 may be located near a front end 114 of the base 102. In addition, the primary alignment feature 108 may be the apex or highest point on the base 102. This will aid in initial positioning of the mouse 200 on the base 102.

Figure 4A:
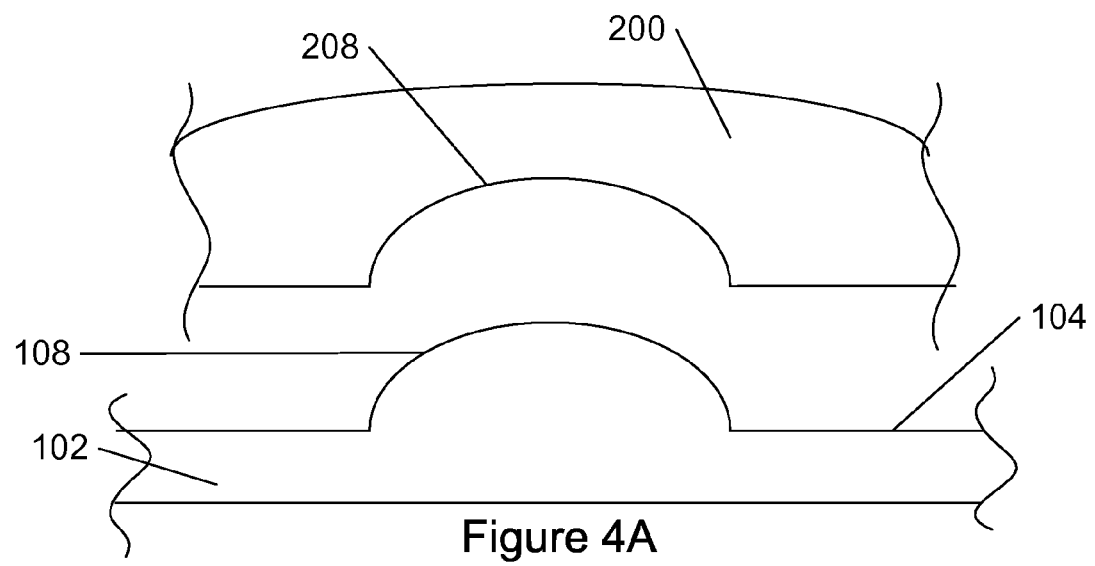
FIGS. 4A-4C illustrate various configurations of alignment feature mating connections.
Figure 4B:
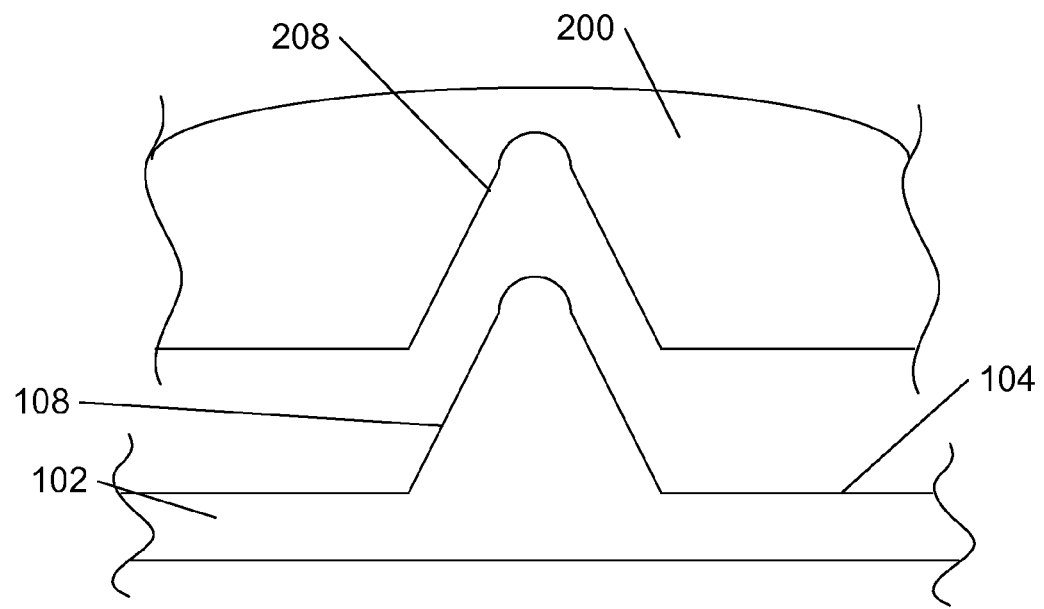
Figure 4C:
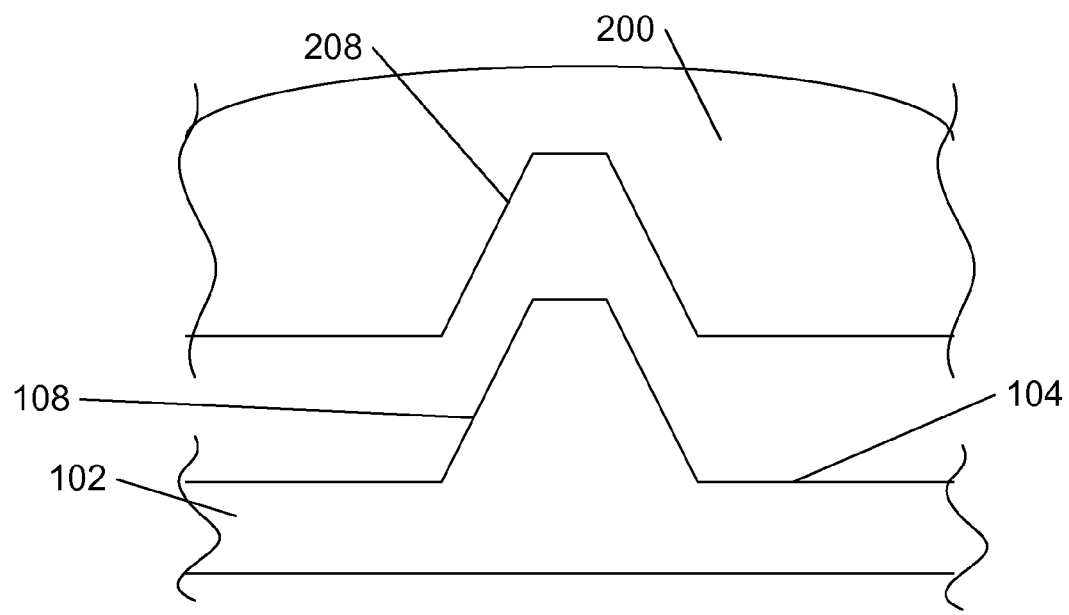

The male primary alignment feature 108 may be any suitable shape to mate with the corresponding female portion of the mouse or input device. In one exemplary arrangement, the primary alignment features 108 (and 208 in FIG. 6) may be a shape that is symmetrical about an origin or axis and is rotatable about that axis. For instance, the primary alignment feature may be hemispherical, conical, a truncated cone, cylindrical, etc. In one specific example depicted in FIG. 4A, the male primary alignment feature 108 may be a hemispherical projection, protruding from the top surface 104 of the base 102. The corresponding female primary alignment feature may be a hemispherical indentation (208 in FIG. 6) in the bottom surface of the mouse 200. FIG. 4B depicts an alternate example in which the primary alignment feature 108 is conical. The male primary alignment feature 108 includes a conical projection protruding from the top surface 104 while the female primary alignment feature 208 is a recess located in the mouse 200. In yet another example depicted in FIG. 4C, the primary alignment features are truncated cones. The male primary alignment feature 108 includes a generally conical projection from the top surface 104 of the base 102. The top portion of the cone is truncate to aid in alignment and stability. The mating portion of the alignment feature 208 is a corresponding truncated conical recess in the bottom surface of the mouse 200.

In another exemplary arrangement, the primary alignment features may not be rotatable about an axis. For instance, the primary alignment feature may be a square, rectangle or other suitable shape providing stability and alignment for the mouse.

When the mouse 200 is connected to the base 102 of the charging dock 100 for charging, the mouse 200 may be positioned such that the female primary alignment feature is positioned over the male primary alignment feature 108 and in contact with it. These primary alignment features may be used as an initial alignment mechanism. For instance, the mouse 200 may be placed over the base 102 in the general vicinity of the primary alignment feature. Contact between the projection of the alignment feature 108 and the mouse 200 may be easily noted by the user. Once initial contact is made, the user may adjust the position of the mouse 200 over the base 102 until the recess of the female primary alignment feature is located over the male alignment feature 108 and the mouse drops onto the male alignment feature 108. Gravity aids in this initial alignment of the mouse 200. Once the initial alignment has been performed, the user may rotate the mouse 200 about the alignment feature 108 until contact is made with the electrical charging connection, discussed below. Once that contact is made, the user may make fine adjustments in the position of the mouse 200 until the charging connection of the mouse is properly aligned with the charging connection of the base. This connection will be noted when the mouse drops down onto the connection on the base.

Figure 5:
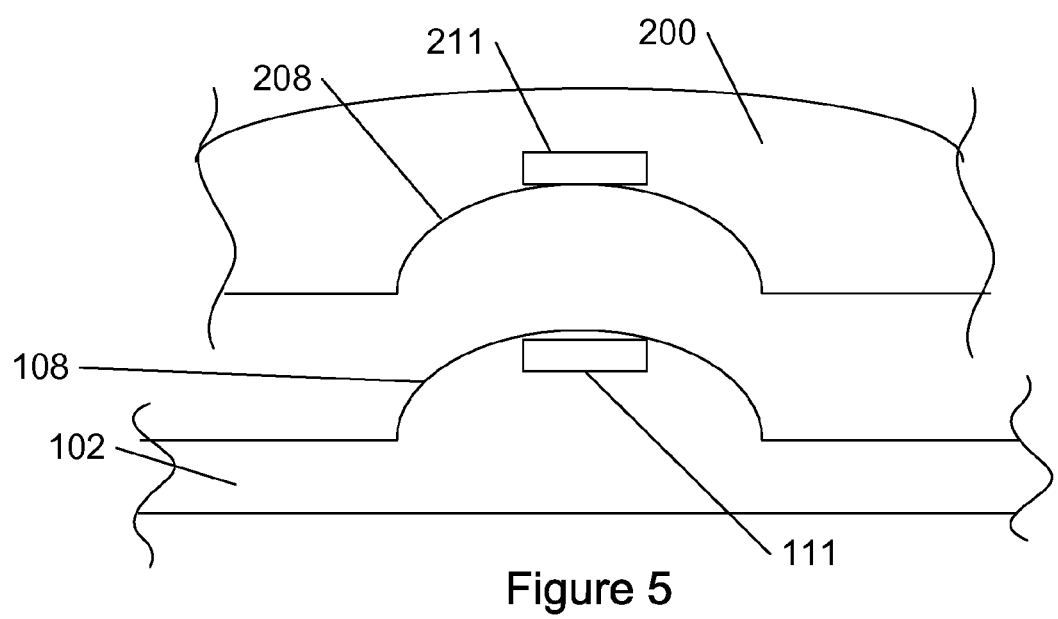
FIG. 5 illustrates one exemplary arrangement of the input device charging system in which magnets are used to aid in aligning and maintaining the position of the input device.

In another arrangement shown in FIG. 5, the input device may be initially aligned and held in position via magnets 111 and 211. For example, a magnet 111 may be embedded in the base and a corresponding magnet 211 may be embedded in the input device. The attraction between the two magnets 111, 211 may align the input device 200 on the charging dock 100 and aid in maintaining the position of the input device 200 during charging. The magnets 111, 211 of this arrangement may provide a sufficient attractive force to aid in alignment of the mouse 200 and maintain the position of the mouse 200 on the charging dock 100. However, the attractive force may be broken by a user applying a reasonable amount of force to remove the mouse 200 from the charging dock 100.

Further to FIGS. 2 and 3, the base 102 also includes an electrical charging connection 110 that enables charging of the mouse 200. The charging connection 110 may be positioned near the rear 112 of the base 102 and include a projection that protrudes from the top surface 104 of the base 102. In another arrangement, the charging connection may be positioned near a front end 114 of the base 102. The charging connection 110 generally includes electrical components that will enable charging an input device when the input device is coupled to the charging dock 100. In one illustrative example, the charging connection 110 includes two pins that are in a raised position when the input device is not coupled to the charging dock 100. In order to form an electrical connection, the pins fit into two recesses within a corresponding charging connection (210 in FIG. 8) on the input device 200. As the input device is coupled to the charging dock 100, the pins are compressed and an electrical connection is formed. Other systems for forming an electrical connection are generally known in the art and may also be used with the input device charging system.

The charging connection 110 formed on the base 102 may also aid in alignment of the input device on the charging dock 100. For example, an input device such as a mouse may be positioned over the male primary alignment feature 108 and lowered to make contact with the male primary alignment feature 108. The mouse may then be further aligned using the charging connection 110. For example, by rotating the mouse about the primary alignment features 108, 208 to a charging position in which the charging connection 210 on the mouse corresponds to the charging connection 110 on the charging dock 100, the mouse will be properly aligned to initiate charging. Ramps (107 in FIG. 6) on each side of the charging connection 110 indicate to the user that the input device is nearing alignment and guide the input device 200 into position. Charging may begin when the mouse is coupled to the charging connection 110 on the base 102 to complete the electrical circuit.

In an alternate arrangement, charging the input device may be by induction. In this arrangement, no physical electrical connection is needed. Accordingly, the male primary alignment feature 108 may protrude from the top surface 104 of the base 102. However, the electrical connection 110 may not be needed. The charging dock 100 may include only the primary alignment feature 108 or it may include a secondary alignment feature 110 that does not include an electrical connection.

When connecting the input device to the charging dock 100 for charging, the mouse 200 may be initially aligned in any direction throughout a horizontal plane. For instance, the mouse 200 may make initial contact with the base 102 in a charging position such that both the primary alignment features 108, 208 and charging connections 110 and 210 are in contact. In an alternate arrangement, the mouse 200 may make initial contact with the charging dock 100 in a position in which the primary alignment features 108, 208 are in contact but the mouse 200 is in a position substantially perpendicular to the base 102, i.e., 90 degrees out of charging position. In yet another arrangement, the mouse 200 may make initial contact with the base 102 in a position in which the primary alignment features 108, 208 are in contact yet the mouse is 180 degrees out of the charging position. The mouse 200 may be initially aligned with the alignment features 108, 208. After the initial alignment, the mouse 200 may be horizontally rotated into position over the electrical connection 110 on the base 102. Once the alignment is made with the charging connection 110, the mouse 200 may be lowered into contact with the charging connection 110 to initiate charging the mouse 200. In yet another arrangement, the mouse 200 may make initial contact with the base 102 in a position in which the primary alignment features 108, 208 are in contact yet the mouse 200 is a few degrees out of charging position. After the mouse 200 is initially aligned, the mouse 200 may be horizontally rotated the appropriate amount into position over the electrical connection 110 on the base 102.

Figure 6:
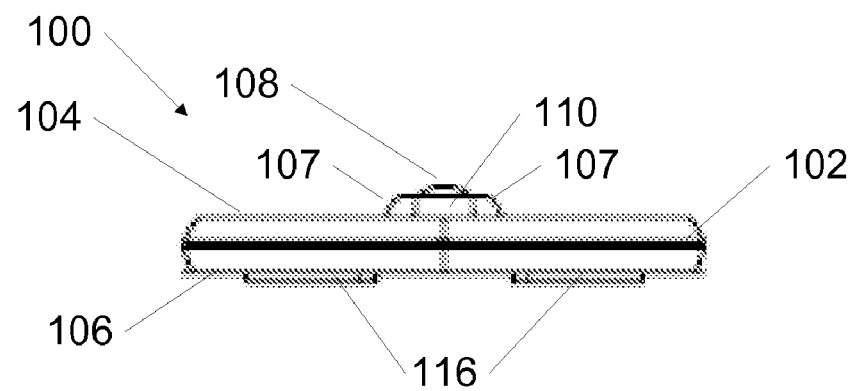
FIG. 6 is a rear view of the charging base of the input device charging system of FIG. 1.
Figure 7:
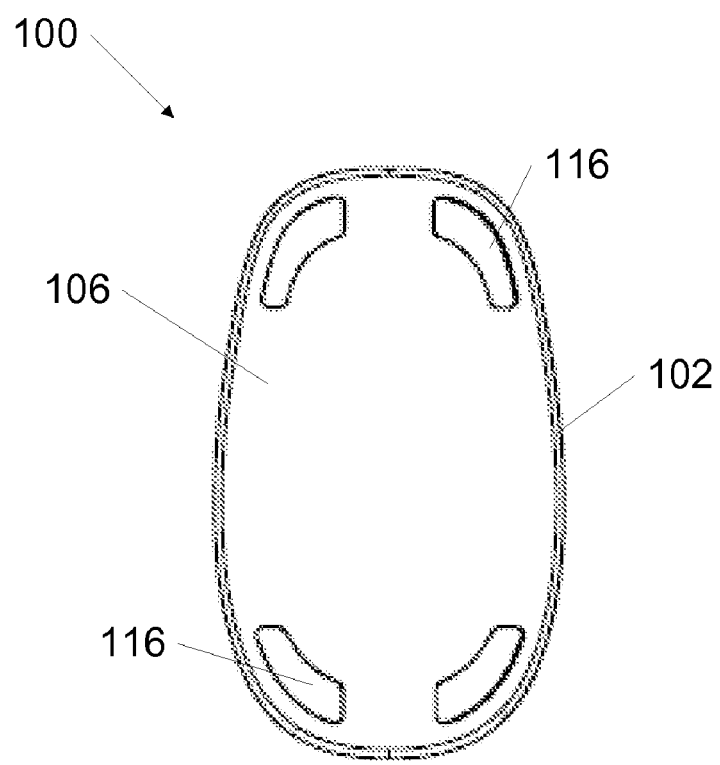
FIG. 7 is a bottom view of the charging base of the input device charging system of FIG. 1.

FIG. 6 is a rear view of the charging dock 100 and FIG. 7 is a bottom view of the charging dock 100. FIG. 6 shows the generally flat top surface 104 and bottom surface 106 of one embodiment of the base 102. The male primary alignment feature 108 may protrude from the top surface 104 of the base 102. FIGS. 6 and 7 also depicts a plurality of non-slip feet 116 that may be located on the bottom surface 106 of the base 102 and are formed of rubber or any suitable material having a high coefficient of friction. The non-slip feet 116 are positioned around the perimeter of the bottom surface 106 of the base 102. The non-slip feet 116 may aid in stabilizing the charging dock 100. For instance, should the charging dock 100 be jarred during charging, the non-slip feet 116 aid in maintaining the position of the charging dock 100 and in preventing the input device being charged from becoming dislodged from the charging dock 100.

Figure 8:
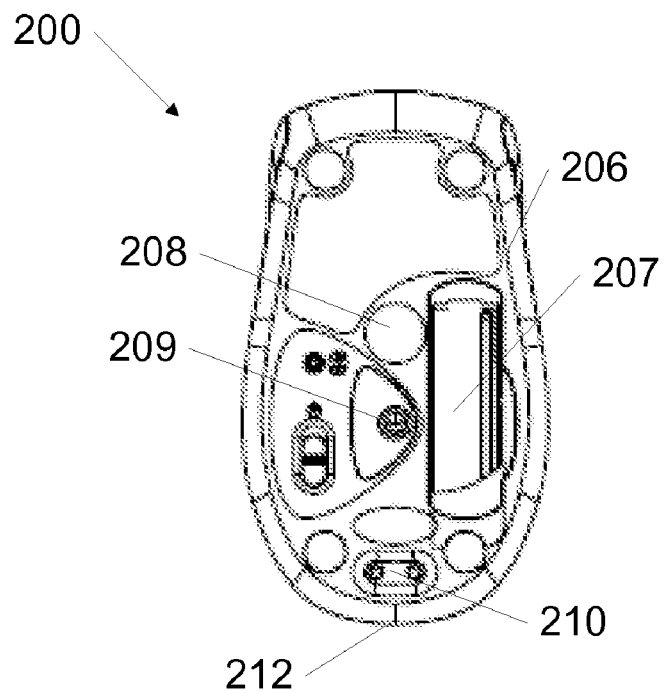
FIG. 8 is a bottom view of a mouse that may be used with the charging base of the input device charging system of FIG. 1.

FIG. 8 is a bottom view of a mouse 200 that may be used with the input device charging system. The mouse 200 shown in FIG. 8 is a full size symmetrical mouse, however, a mouse of any footprint or shape may be used with the input device docking system. For instance, a travel size mouse, a left-handed mouse, a right-handed mouse, a two-button mouse, a four-button mouse, a mouse with locking buttons or a scroll wheel or any other type of mouse design may be used with the input device charging system. The input device charging system is not limited to use with one particular mouse model or shape. In addition, the input device charging system is not limited to use with a mouse with which it is sold. A mouse with the proper alignment and charging connections may be purchased separately from the charging dock, either at the same time as the dock or as an after-market type of product.

As used herein, the term "mouse" is commonly used to refer to a computer input mouse design having a tracking system such as, but not limited to, an optical tracking system 209 for determining the relative movement between the mouse and a surface upon which it rests. The mouse transmits signals generated by a movement sensor and may be used to control a geographical pointer or a display of a computer system. In use, the mouse 200 is connected to a computer and provides signals to the computer and can control a cursor or other object on a monitor. The connection may be a wireless connection using a wireless transmitter and receiver as is known in the art. The mouse may also include a power supply 207 such as a battery. In one arrangement, the battery is a rechargeable type battery.

The mouse device 200 preferably includes a housing having a substantially flat bottom surface 206 such that it is configured to rest on a flat supporting surface. The housing further includes an upper body shaped to interface with and preferably support the human hand and a plurality of actuators. The mouse also includes an optical tracking system 209 that determines the relative movement between the supporting surface and the mouse. In one illustrative example, the optical tracking system 209 includes a light source that is directed at the supporting surface through the bottom of the housing, and an optical sensor inside of the housing that determines the relative movement between the supporting surface and the mouse. This tracking device and method as described herein is well known.

Further to FIG. 8, the female primary alignment feature 208 is visible. The female primary alignment feature 208 is a recess formed in the bottom surface 206 of the mouse 200. In one example, the female alignment feature 208 may be hemispherical to correspond to the hemispherical male portion of the alignment feature 108 located on the base 102. The female primary alignment feature 208 may be located in the center of the mouse 200 to correspond to the male primary alignment feature 108 that may be located in the center of the base 102. The male primary alignment feature 108 may be formed in a different location on the top surface 204 of the base 102. The female primary alignment feature 208 may be formed in a location to correspond to the male primary alignment feature 108.

In addition, the mating portion of the electrical connection 210 is visible on the bottom surface 206 of the mouse 200. The electrical connection 210 may be formed at the rear 212 of the mouse 200 to correspond to the electrical connection 110 formed at the rear 112 of the base 102.

Figure 9:
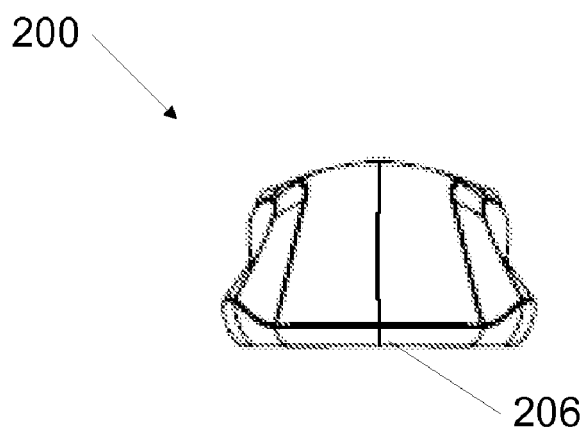
FIG. 9 is a rear view of the mouse of FIG. 6.

FIG. 9 is a rear view of the mouse 200 that may be used with the input device charging dock 100. The rear view shows the generally flat surface of the bottom 206 of the mouse 200. This generally flat surface ensures that no obstructions or protrusions interfere with the smooth operation of the mouse 200. Any connections that may be needed for charging the mouse 200 are within the mouse 200, rather than protruding from the bottom surface 206 of the mouse 200. According to this arrangement, the mouse 200 may slide smoothly along a work surface when in operation.

Figure 10:
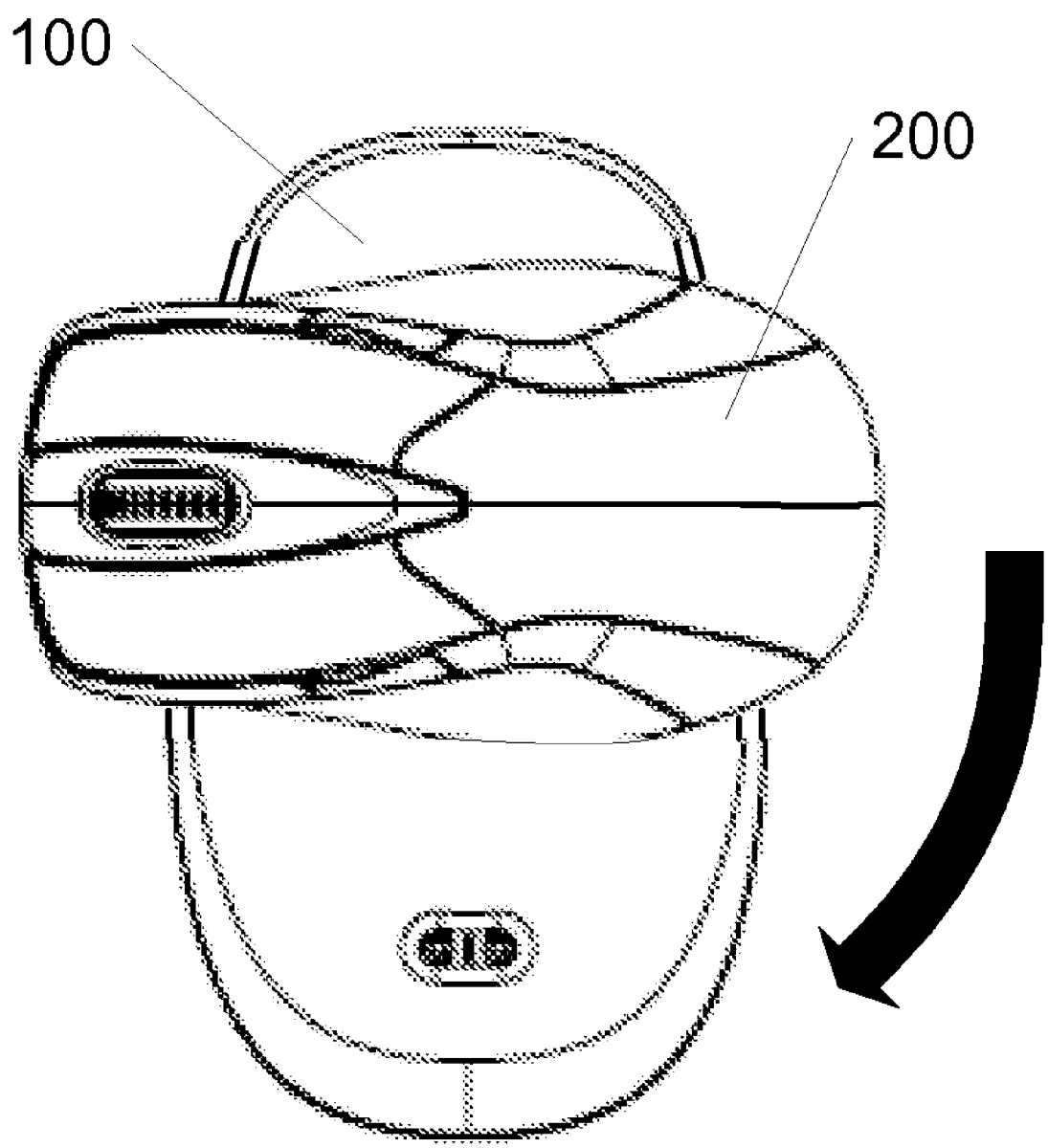
FIG. 10 illustrates one method of placing the mouse onto the charging base.

FIG. 10 depicts one possible method of inserting the input device 200 into the charging dock 100 to initiate charging. For example, to initiate charging of the input device 200, the device, such as a mouse 200, is horizontally positioned over the male primary alignment feature such that the female primary alignment feature is aligned and in contact with the male primary alignment feature. This positioning may provide an initial alignment for the input device 200. The primary alignment features may be in contact with the mouse 200 facing in any direction in a horizontal plane. The mouse 200 is then be rotated about the alignment feature to a charging position. The arrow of FIG. 10 depicts the direction in which the mouse 200 may be rotated. The charging position is achieved when the charging connections are aligned and in contact with each other. Once the mouse 200 is properly aligned with the primary alignment features and the charging connections, the mouse 200 may be horizontally lowered onto the dock to complete the electrical connection and initiate charging.

This horizontal charging arrangement may add stability to the charging system. For example, should the charging dock be jarred while an input device is being charged, the horizontal arrangement may be more likely to maintain the charging position of the input device than a charging system in which the input device is charged in a vertical position.

Figure 11:
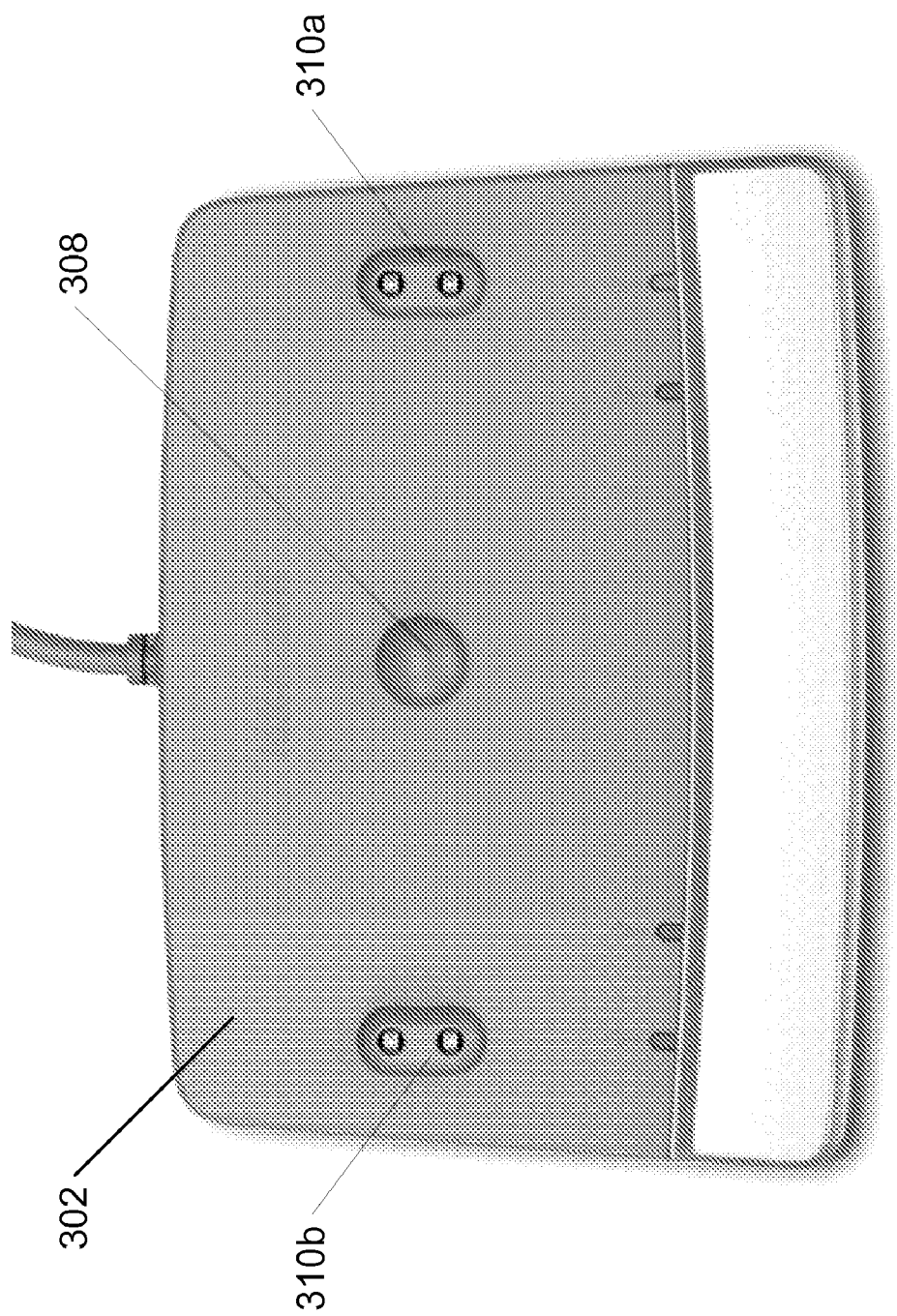
FIG. 11 illustrates another arrangement of the input device charging system.

FIG. 11 depicts another arrangement of the input charging device. In the arrangement of FIG. 11, the base 302 includes a primary alignment feature 308. In addition, the base 302 includes two charging connections 310a and 310b. The charging connections 310a and 310b are located at opposite ends of the base 302. During charging, the input device is in contact with the primary alignment feature 308 and one of the two charging connections 310a, 310b. This arrangement allows ease of placement of the input device for either a left handed or right handed user. For example, a left handed mouse user may choose to place the mouse in one direction, while a right handed mouse user may choose to place the mouse in an opposite direction. The dual charging connections provide one system to accommodate both types of users.

In another arrangement, the input device may be charged in a horizontal position and held in place at one point along the input device. For example, the charging dock may include a protrusion from one end of the dock. The input device being charged may include a corresponding indentation in the bottom surface of the device into which the protrusion may fit. This single connection point may provide both alignment for the input device being charged and may include any electrical connections needed for charging. This arrangement may also provide stability due to its horizontal position and may allow any shape or footprint mouse or input device to be utilized.

In yet another arrangement, the input device may be charged in a horizontal position and may be held in place on the charging dock by charging in an indented portion on the dock. The input device may be placed in the indented region on the dock for charging. Charging the device may be by induction or via an electrical connection that may protrude from the surface within the indented region and connect to a mating connection on the input device. This arrangement provides stability due to the horizontal position and indented region that will aid in maintaining the position of the input device.

In yet another arrangement, the input device may be charged in a horizontal position and held in place by a surface protruding from the top surface of the charging dock and configured to correspond to a recessed portion formed on the bottom surface of the input device. For instance, a raised region may be formed on the charging dock. An input device may include a corresponding recessed portion of the same shape as the raised region. To initiate charging, the device is placed on the dock with the recessed portion aligning with the raised portion. An electrical connection may be included in the raised and recessed portions or charging may be done by induction. Magnets located in the raised and recessed portions may aid in alignment with this arrangement.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

We claim:

1. A user input device charging system, comprising:
   a base configured for receiving a user input device and having a first alignment feature having a male type alignment feature extending upwardly from a top surface of the base, wherein the top surface of the base is generally planar, and wherein the base is void of structure that would prevent a user input device from being rotated about the first alignment feature;
   a user input device configured with a planar bottom surface, wherein the user input device is supported on its bottom surface by the planar top surface of the base, and wherein the user input device includes a second alignment feature having a recess formed in the planar bottom surface of the user input device, the second alignment feature corresponding to the shape of the first alignment feature of the base and configured for mating with the first alignment feature when the second alignment feature is positioned over the first alignment feature and the planar bottom surface of the user input device is on the planar top surface of the base;
   wherein when the first and second alignment features are mated the planar top surface of the base is horizontally coupled to the planar bottom surface of the user input device such that the input device is not prevented from being rotated about the first alignment feature; and
   a charging connection further including a first charging element extending upwardly from the planar top surface of the base and a corresponding second charging element formed on the planar bottom surface of the user input device wherein the first and second charging elements are electrically connected when the first and second alignment features are mated and when the planar bottom surface of the user input device is horizontally coupled to the planar top surface of the base.

2. The input device charging system of claim 1, wherein the user input device is a mouse.

3. The user input device charging system of claim 1, wherein each of the first and second alignment features includes a magnet.

4. The user input device charging system of claim 1, wherein the first and second alignment features are generally hemispherical.

5. The user input charging system of claim 1, further including a plurality of non-skid pads connected to a bottom surface of the base.

6. A user input device configured to rest horizontally on a supporting planar top surface of a base, comprising:
   a housing having a contoured upper portion and a recess formed in a planar bottom surface of the housing, the recess being configured to receive a projection mating component of the base, wherein said projection mating component is a projection extending upwardly from the planar top surface of the base, such that the recess makes contact with the projection mating component when the recess of the housing is positioned over the projection mating component and the planar bottom surface of the housing is on the planar top surface of the base, and wherein the recess and the projection mating component are configured to allow rotation about the projection mating component;

a plurality of actuators;

a motion detecting system for determining relative movement of the user input device;

a charging element formed in the planar bottom surface of the user input device and configured to receive a mating charging element wherein the planar bottom surface of the user input device receives the mating charging element when the projection mating component is received within the recess of the user input device;

wherein the charging element is formed at the periphery of the bottom surface of the user input device and the recess is formed in the interior area of the bottom surface of the user input device.

7. The user input device of claim 6, wherein the mating component and the recess are generally hemispherical.

8. The user input device of claim 6, wherein the motion detecting system is an optical tracking system.

9. The user input device of claim 6, further including a battery configured to act as a power source.

10. The user input device of claim 9, wherein the battery is a rechargeable type battery.

11. The user input device of claim 6, wherein the charging elements include components for forming an electrical connection.

12. A user input device charging system, comprising:

a user input device having a planar bottom surface;

a base configured for receiving the planar bottom surface of the user input device in a horizontal position and configured for supporting the planar bottom surface of the user input device and including a first alignment feature and a second alignment feature, wherein the top surface of the base is generally planar, wherein the first alignment feature is a projection and the second alignment feature includes components for forming a charging connection, and wherein the base is void of structure that would prevent an input device from being rotated about the first alignment feature; and said input device configured with a planar bottom surface for horizontal placement on the base and including a third alignment feature and a fourth alignment feature, wherein the third alignment feature is a recess formed in the planar bottom surface of the user input device and configured to mate with the first alignment feature when the third alignment feature is positioned over the first alignment feature and the planar bottom surface of the user input device is on the planar top surface of the base, wherein when the first and third alignment features are mated, the planar top surface of the place is horizontally coupled to the planar bottom surface of the user input device such that the user input device is not prevented from being rotated about the first alignment feature, and the fourth alignment feature is configured to electrically couple to the second alignment feature, wherein the fourth alignment feature includes components for forming a charging connection with the base wherein the second and fourth alignment features are electrically coupled when the first and third alignment features are coupled and when the planar bottom surface of the user input device is horizontally coupled to the planar top surface of the base.

13. The input device charging system of claim 12, wherein the input device is a mouse.

14. The input device charging system of claim 12, wherein the second alignment features are projections and the fourth alignment features are recesses.

15. The input charging device of claim 12, wherein the first and third alignment features are generally hemispherical.

* * * * *